(12) United States Patent
Yamada et al.

(10) Patent No.: US 12,415,762 B2
(45) Date of Patent: Sep. 16, 2025

(54) METHOD OF PRODUCING SiC—Si COMPOSITE COMPONENT AND SiC—Si COMPOSITE COMPONENT

(71) Applicant: AGC Inc., Tokyo (JP)

(72) Inventors: Kenji Yamada, Tokyo (JP); Kenichiro Terada, Tokyo (JP); Nobuhiro Shinohara, Tokyo (JP); Shinya Kikugawa, Tokyo (JP); Yasuo Shinozaki, Tokyo (JP); Shunsuke Susa, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 18/743,745

(22) Filed: Jun. 14, 2024

(65) Prior Publication Data

US 2024/0327297 A1     Oct. 3, 2024

Related U.S. Application Data

(60) Division of application No. 17/029,739, filed on Sep. 23, 2020, now abandoned, which is a continuation of
(Continued)

(30) Foreign Application Priority Data

Apr. 3, 2018  (JP) ................................ 2018-071771
Mar. 27, 2019  (JP) ................................ 2019-061755

(51) Int. Cl.
*C04B 35/573*  (2006.01)
*C04B 35/622*  (2006.01)
(Continued)

(52) U.S. Cl.
CPC ...... *C04B 35/573* (2013.01); *C04B 35/62218* (2013.01); *C04B 35/62839* (2013.01);
(Continued)

(58) Field of Classification Search
CPC ............ C04B 35/573; C04B 35/62218; C04B 35/62839; C04B 35/657; C04B 2235/383;
(Continued)

(56) References Cited

U.S. PATENT DOCUMENTS 6,699,411 B2    3/2004  Odaka et al.
2007/0225151 A1  9/2007  Suyama et al.
(Continued)

FOREIGN PATENT DOCUMENTS

CN      105439564 A     3/2016
EP      1 996 530 A2   12/2008
(Continued)

OTHER PUBLICATIONS

Suyama et al., "Development of High Strength Reaction-Sintered Silicon Carbide," Journal of the Ceramic Society of Japan, vol. 109, No. 4, 2001, pp. 315-321.
(Continued)

*Primary Examiner* — Andrew J. Oyer
(74) *Attorney, Agent, or Firm* — Foley & Lardner LLP

(57) ABSTRACT

The present invention relates to a method of producing a SiC—Si composite component. The method includes preparing a first molded body containing SiC particles by a 3D printing method, wherein the first molded body has a first average pore diameter $M_1$;

forming a second molded body, in which the first molded body and a dispersion containing carbon particles are brought into contact so that the pores are impregnated with the carbon particles, wherein the carbon particles have a secondary particle having an average particle diameter $M_2$, and the carbon particles satisfy the following formula:

$M_2 \leq M_1/10$; and (Continued)

forming a SiC—Si composite component by carrying out that the second molded body is impregnated with a metallic si and is reactively sintered;

wherein the content of Si is in the range of 5% by mass to 40% by mass in the SiC—Si composite component.

13 Claims, 5 Drawing Sheets

Related U.S. Application Data application No. PCT/JP2019/014492, filed on Apr. 1, 2019.

(51) Int. Cl.
  *C04B 35/628* (2006.01)
  *C04B 35/657* (2006.01)
  *C09K 5/14* (2006.01)
(52) U.S. Cl.
  CPC .............. *C04B 35/657* (2013.01); *C09K 5/14* (2013.01); *C04B 2235/383* (2013.01); *C04B 2235/3834* (2013.01); *C04B 2235/422* (2013.01); *C04B 2235/428* (2013.01); *C04B 2235/5436* (2013.01); *C04B 2235/5445* (2013.01); *C04B 2235/6026* (2013.01); *C04B 2235/616* (2013.01); *C04B 2235/77* (2013.01); *C04B 2235/9607* (2013.01)
(58) Field of Classification Search
  CPC ...... C04B 2235/3834; C04B 2235/422; C04B 2235/428; C04B 2235/5436; C04B 2235/5445; C04B 2235/6026; C04B 2235/616; C04B 2235/77; C04B 2235/9607; C04B 35/565; C04B 35/62625; C04B 35/6263; C04B 35/62655; C04B 2235/5427; C04B 2235/606; C04B 2235/762; C04B 2235/767; C04B 2235/786; C04B 2235/80; C04B 41/88; C04B 41/5001; C04B 41/5096; C04B 2235/5454; C04B 2235/788; C09K 5/14; Y02P 10/25; B28B 1/30

See application file for complete search history.

(56) References Cited

U.S. PATENT DOCUMENTS

| | | |
|---|---|---|
| 2010/0119945 A1 | 5/2010 | Akagi et al. |
| 2013/0344411 A1* | 12/2013 | Suyama ................ H01M 8/186 429/434 |
| 2016/0052829 A1 | 2/2016 | Schoenfeld et al. |
| 2016/0083300 A1* | 3/2016 | Ide ........................ B29C 64/153 428/448 |
| 2016/0272548 A1 | 9/2016 | Lynen et al. |

FOREIGN PATENT DOCUMENTS

| | | |
|---|---|---|
| JP | H05-32458 A | 2/1993 |
| JP | 2001-019552 A | 1/2001 |
| JP | 2016-204244 A | 12/2016 |
| WO | WO-2007/100698 A2 | 9/2007 |

OTHER PUBLICATIONS

International Searching Authority, "International Search Report," issued in connection with International Patent Application No. PCT/JP2019/014492, dated Jul. 2, 2019.

International Searching Authority, "Written Opinion," issued in connection with International Patent Application No. PCT/JP2019/014492, dated Jul. 2, 2019.

Li et al., "The Treatment Technology and Application of Micrometer-Nanometer Powders", National Defense Industry Press, published on Sep. 2005, pp. 72-77.

Notification of Reexamination issued in corresponding Chinese Patent Application No. 201980024382.2 dated May 23, 2025.

* cited by examiner

β-SiC

METHOD OF PRODUCING SiC—Si COMPOSITE COMPONENT AND SiC—Si COMPOSITE COMPONENT

CROSS-REFERENCE TO RELATED APPLICATIONS

This application is a Divisional of U.S. patent application Ser. No. 17/029,739 filed on Sep. 23, 2020, which is a Bypass Continuation of International Application PCT/JP2019/014492 filed on Apr. 1, 2019, which is based upon and claims the benefit of priority of Japanese Patent Applications No. 2018-071771 filed on Apr. 3, 2018 and No. 2019-061755 filed on Mar. 27, 2019. The contents of these applications are hereby incorporated by reference in their entireties.

TECHNICAL FIELD

The present invention relates to a method of producing a SiC—Si composite component and a SiC—Si composite component.

BACKGROUND OF THE INVENTION

Sintered components formed by a composite material containing silicon carbide (SiC) and silicon (Si) (hereinafter referred to as "SiC—Si composite component") have a low coefficient of thermal expansion, excellent heat resistance, wear resistance and thermal conductivity, and has demands in many fields.

SiC—Si composite components can be produced by applying, for example, a casting method (for example, Patent Document 1 and Non-Patent Document 1).

For example, in the method of Non-Patent Document 1, a molded body containing silicon carbide powder and carbon powder is prepared by applying a pressure casting method, followed by impregnating molten metallic Si into the molded body so that the molded body is reactively sintered to produce a SiC—Si composite component.

RELATED-ART DOCUMENT

Patent Documents

Patent document 1: Japanese Unexamined Patent Publication No. 2001-19552

Non-Patent Documents

Non-Patent Document 1: Shoko Suyama et al., Journal of the ceramic society of Japan, 109 [4], pp. 315-321, (2001)

SUMMARY OF THE INVENTION

Problems to Be Solved by the Invention

In recent years, there has been increasing demand for SiC—Si composite components having complex shapes. However, it is difficult to produce a SiC—Si composite component having a complex shape using the above-described cast molding method.

Therefore, it has been proposed to produce a SiC—Si composite component having a complex shape by a powder lamination molding method (so-called "3D printing method").

In this method, for example, a first powder layer containing SiC particles and a binder is irradiated with a laser. As a result, the particles are bound to each other via the binder activated by the heat of the laser. Then, the same process is performed on the second powder layer laminated on the first powder layer. By repeating such steps, a three-dimensional shaped molded body is formed.

Then, the molded body thus formed is impregnated with Si, whereby a SiC—Si composite component can be produced.

However, generally, a sintered component produced by the 3D printing method has a problem that mechanical properties are not favorable.

Therefore, there is still a demand for a technique for producing a SiC—Si composite component having a complex shape without sacrificing mechanical properties.

The present invention has been made in view of such a background, and the present invention can be applied to the production of a sintered component having a complex shape. An object of the present invention is to provide a method of producing a SiC—Si composite component capable of obtaining a sintered component having a favorable mechanical strength. In addition, an object of the present invention is to provide a SiC—Si composite component having a favorable mechanical strength.

Means for Solving the Problems

The present invention provides a method of producing a SiC—Si composite component including:
preparing a first molded body containing SiC particles by a 3D printing method, wherein the first molded body has a first average pore diameter $M_1$;
forming a second molded body, in which the first molded body and a dispersion containing carbon particles are brought into contact so that the pores are impregnated with the carbon particles, wherein the carbon particles have a secondary particle having an average particle diameter $M_2$, and the carbon particles satisfy the following formula:

$$M_2 \leq M_1/10;$$

forming a SiC—Si composite component by carrying out that the second molded body is impregnated with a metallic Si and is reactively sintered;
wherein the content of Si is in the range of 5% by mass to 40% by mass in the SiC—Si composite component.

In addition, the present invention provides a SiC—Si composite component including:
a sea-island structure containing α-SiC particles having an average particle size of 30 μm to 200 μm, β-SiC particles having an average particle size of 1 μm to 20 μm, and a metallic Si,
wherein the metallic Si is configured as a sea portion of the sea-island structure, and a first island portion formed from the α-SiC particles and a second island portion formed from the β-SiC particles are placed in the sea portion configured by the metallic Si.

Effect of the Invention

The present invention can be applied to the production of a sintered component having a complex shape, and the present invention is able to provide a method of producing a SiC—Si composite component that yields a sintered component having favorable mechanical strength. In addition, the present invention is able to provide a SiC—Si composite component having a favorable mechanical strength.

DETAILED DESCRIPTION

Figure 1:
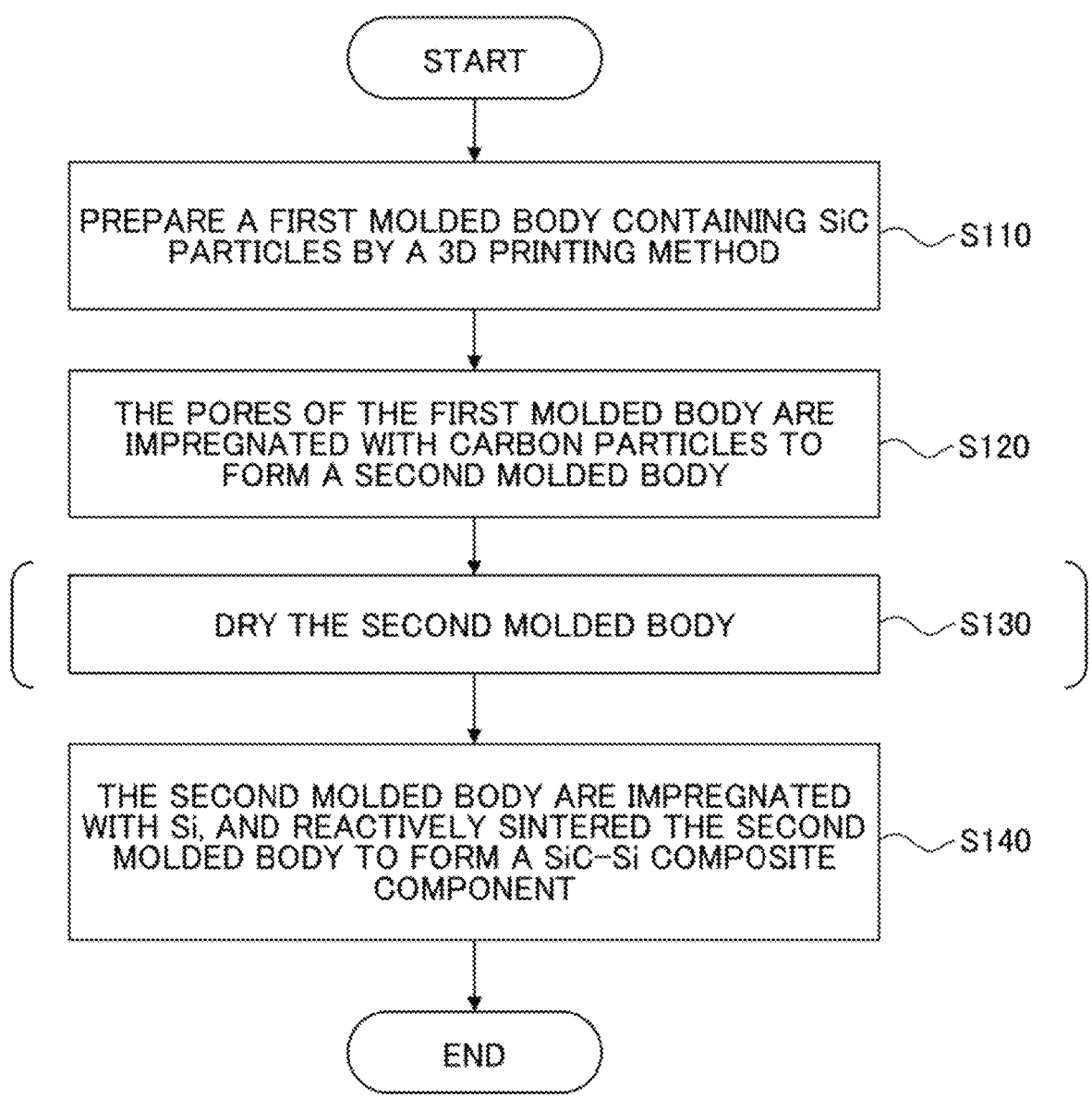
FIG. 1 is a diagram schematically showing a flow of an example of a method of producing a SiC—Si composite component according to an embodiment of the present invention.

An embodiment of the present invention will be described below with reference to the drawings.

One aspect of the present invention is a method of producing a SiC—Si composite component including:

(Step I) preparing a first molded body containing SiC particles by a 3D printing method, wherein the first molded body has a first average pore diameter $M_1$;

(Step II) forming a second molded body, in which the first molded body and a dispersion containing carbon particles are brought into contact so that the pores are impregnated with the carbon particles, wherein the carbon particles have a secondary particle having an average particle diameter $M_2$, and the carbon particles satisfy the following formula:

$$M_2 \leq M_1/10;$$

and (Step III) forming a SiC—Si composite component by carrying out that the second molded body is impregnated with a metallic Si and is reactively sintered; wherein the content of Si is in the range of 5% by mass to 40% by mass in the SiC—Si composite component.

Because such a method of producing a SiC—Si composite component uses the 3D printing method, it is possible to produce a composite component with a complex shape and/or a large-sized shape, which is difficult by the casting method.

Here, as described above, in the 3D printing method, a molded body including many pores is formed. Therefore, there is a problem in that the sintered body produced through such a molded body does not exhibit favorable mechanical strength.

However, in the above production method, the first molded body is prepared by using the 3D printing method in step (I), then pores of the first molded body are impregnated with carbon particles in step (II), so that a second molded body is formed.

Particularly, in step (II), the carbon particles contained in the dispersion are selected so that the average particle diameter $M_2$ of secondary particles is smaller than $1/10$ of the first average pore diameter $M_1$ of the first molded body. Therefore, the carbon particles can move into the pores of the first molded body relatively easily, and the pores can be impregnated with a relatively large number of carbon particles.

In the present application, the average pore diameter of the pores of the molded body is defined as the pore diameter when the volume of the cumulative pore becomes 50% in the cumulative volume distribution chart of the pore diameter measured by the mercury porosimeter.

The average particle size of the secondary particles (aggregated particles) can be measured using a laser diffraction/scattering particle size distribution measuring device (MT3300EXII manufactured by MicrotracBEL Corp.).

Further, according to one embodiment of the present invention, in step (III), the second molded body is impregnated with Si, then the second molded body is reactively sintered. During the reactive sintering, SiC is generated in the pores of the second molded body by the reaction between the introduced Si and the carbon particles. Because the pores are filled with the newly generated SiC, a SiC—Si composite component having low porosity and high bulk density can be produced.

As a result, although the 3D printing method is used in the production method according to the embodiment of the present invention, the mechanical strength of the produced SiC—Si composite component can be significantly improved.

Method of Producing SiC—Si Composite Component According to One Embodiment of the Present Invention Hereinafter, an example of a method of producing a SiC—Si composite component according to an embodiment of the present invention will be described in detail with reference to FIG. 1.

FIG. 1 schematically shows a flow of an example of a method of producing a SiC—Si composite component according to an embodiment of the present invention.

As shown in FIG. 1, this production method (hereinafter, referred to as "first production method") has the following steps:

(1) a step (step S110) of preparing a first molded body containing SiC particles by a 3D printing method,
(2) a step of impregnating the pores of the first molded body with carbon particles to form a second molded body (step S120),
(3) a step of drying the second molded body (step S130), and (4) a step of impregnating the second molded body with Si and subjecting the second molded body to reaction sintering to obtain a SiC—Si composite member (step S140).

However, of these, step S130 is a step that is performed as needed, and is not an essential step in the first production method.

Hereinafter, each step will be described in more detail.

Step S110

In step S110, a first molded body containing SiC particles is formed using a 3D printing method.

3D Printing Method

First, the 3D printing method used in the first production method will be described.

The 3D printing method used in this step S110 is not particularly limited. In step S110, for example, a 3D printing method such as a "laser irradiation modeling method" or a "binder jet modeling method" may be used.

Among these, in the laser irradiation modeling method, a powder layer containing SiC particles and a binder is irradiated with a laser. The binder in the irradiated area is melted by the heat of the laser, then solidifies. As a result, each SiC particles is bonded. Such procedure is applied to each powder layer which is successively laminated so that a first molded body having a three-dimensional structure is formed.

Alternatively, in the binder jet molding method, the binder is sprayed from the inkjet nozzle to the powder layer. In the area where the binder is sprayed, the SiC particles are bound each other. This operation is repeated every time the powder layers are laminated, so that the first molded body having a three-dimensional structure is formed.

In the binder jet molding method, the powder layer may contain a curing agent in advance, and the binder may be reacted and cured only in an area where the sprayed binder and the curing agent come into contact with each other. The content of the curing agent may be, for example, about 0.1% by mass to 1% by mass with respect to the powder layer.

In either molding method, a thermosetting resin such as a phenol resin and a self-curing resin such as a furan resin can be used as the binder.

The thickness of one powder layer used in the 3D printing method is usually in the range of 200 μm to 300 μm.

SiC Particles

The average particle size of the SiC particles contained in the powder layer may be, for example, in the range of 30 μm to 200 μm. The average particle diameter of the SiC particles is preferably in the range of 50 μm to 180 μm.

The SiC particles are preferably α-Sic.

In general, the larger the average particle diameter of the SiC particles becomes, the larger the average pore diameter $M_1$ of the pores contained in the first molded body is formed. Therefore, when the average pore diameter $M_1$ of the pores is desired to be relatively small, SiC particles having a relatively small average particle diameter may be selected. When the average pore diameter $M_1$ of the pores is desired to be relatively large, SiC particles having a large average particle diameter may be selected.

However, if the average particle size of the SiC particles is too small, in the later step of S120, the pores of the first molded body may not be sufficiently impregnated with the carbon particles. Therefore, the average particle diameter of the SiC particles is preferably 30 μm or more.

Any powder such as granulated powder or spherical powder can be used as the SiC particles.

The average particle size of the SiC particles can be measured by a laser diffraction/scattering particle size distribution measuring device (MT3300EXII manufactured by MicrotracBEL Corp.).

First Molded Body

The first molded body produced by the 3D printing method is usually a porous body and has a large number of pores.

The volume occupied by the SiC particles in the first molded body is, for example, in the range of 30 vol % to 50 vol %. In other words, the volume of the pores in the first molded body, that is, the porosity may be in the range of 50 vol % to 70 vol %.

The bulk density of the first molded body is, for example, in the range of 0.97 g/cm³ to 1.61 g/cm³.

The average pore diameter $M_1$ of the pores of the first molded body may be, for example, 20 μm to 100 μm and particularly 30 μm to 100 μm. However, the average pore diameter $M_1$ of the pores of the first molded body may be varied depending on the particle diameter of the SiC particles used, the degree of compression of the powder layer, and the like.

The porosity of the first molded body and the average pore diameter $M_1$ of the pores can be measured using the mercury porosimeter as described above.

The size and shape of the first molded body produced by the 3D printing method are not particularly limited.

However, it should be noted that the first production method can be applied to a large-sized molded body and/or a complex molded body. In particular, the first production method can also produce a molded body having a complex shape, which is difficult to produce by the casting method.

Step S120

Next, in step S120, the pores of the first molded body are impregnated with carbon particles to form a second molded body.

In this step, a dispersion in which carbon particles are dispersed is used. That is, the pores can be impregnated with the carbon particles contained in the dispersion by immersing the first molded body in the dispersion or injecting the dispersion into the first molded body.

In the former case, the impregnation treatment is preferably carried out under reduced pressure. Pores can be efficiently impregnated with a dispersion under reduced pressure environment. Further, it is preferable to hold the first molded body in a pressurized environment after once the pores of the first molded body are impregnated with dispersion. This allows the dispersion to be introduced even more into the pores of the first molded body.

The concentration of carbon particles contained in the dispersion is, for example, in the range of 20% by mass to 60% by mass. The concentration of carbon particles is preferably high as long as the carbon particles do not precipitate. Therefore, the concentration of carbon particles is, for example, preferably in the range of 30% by mass to 55% by mass.

The carbon particles are preferably nanoparticles or aggregates of nanoparticles. For example, the average particle size $M_2$ of aggregated particles (secondary particles) of carbon particles is in the range of 100 nm to 200 nm and preferably in the range of 110 nm to 150 nm. Reducing the average particle size $M_2$ of the aggregated particles of carbon particles to less than 100 nm is not practical because it is necessary to significantly increase the content of the dispersant, and the viscosity of the dispersion tends to increase. The average particle size $M_2$ of the aggregated particles of carbon particles of larger than 200 nm is not preferably used, because the dispersibility is deteriorated and the particles are apt to precipitate.

The dispersion medium contained in the dispersion is not particularly limited. The dispersion medium may include, for example, water and/or alcohol.

Here, the carbon particles are selected so that the average particle size $M_2$ is 1/10 or less of the average pore size $M_1$ of the pores present in the first molded body. That is, $M_2 \leq M_1/10$.

The above particle size, ensures that the carbon particles are introduced into the pores of the first molded body. For example, when the average particle diameter $M_2$ of the carbon particles is approximately the same as the average pore diameter $M_1$ of the pores present in the first molded body, it becomes difficult to impregnate a sufficient amount of carbon into the pores.

As a further example, the average particle diameter $M_2$ of the carbon particles is preferably selected so that the average particle diameter $M_2$ of the carbon particles with respect to the average pore diameter $M_1$ of the pores of the first molded body is $M_2 \leq M_1/30$, $M_2 \leq M_1/50$, $M_2 \leq M_1/100$, and $M_2 \leq M_1/200$.

Instead of using the above-mentioned dispersion, the first molded body may be impregnated with a carbon source such as a phenol resin or an epoxy resin and then heat-treated to generate (precipitate) carbon from the carbon source.

However, such a method requires an additional reaction step for producing (precipitating) carbon from the carbon source. Further, in order to generate (precipitate) a sufficient amount of carbon, it is necessary to repeat the process of impregnating the carbon source and the process of carbon precipitation several times. As a result, the production method becomes complicated. Furthermore, especially when the carbon source is a solid, it is difficult to introduce carbon into the pores of the first molded body as intended by the carbon deposition reaction.

Thus, the method of using carbon sources and depositing carbon from the carbon sources is problematic and, thus, is not practical.

However, in the first production method, the pores of the first molded body are impregnated with the carbon particles using a dispersion containing the carbon particles. Therefore, in the first production method, steps such as carbon deposition reaction can be omitted, and the production method can be simplified.

The concentration of carbon particles contained in the dispersion can be adjusted as appropriate. Therefore, the number of impregnation steps with the dispersion can be minimized, and the production method can be simplified. For example, when a dispersion having a carbon particle concentration of 30% by mass or more is used, one impregnation step is sufficient.

Further, in the first production method, a dispersion containing carbon particles has a relationship between the average pore diameter $M_1$ and the average particle diameter $M_2$ of $M_2 \leq M_1/10$. Therefore, many carbon particles can be relatively easily introduced into each pore of the first molded body.

Furthermore, in the first production method, carbon particles having a relatively small average particle size are introduced into the pores of the molded body. Such small carbon particles have an advantage that the reaction surface area is significantly increased and the reactivity can be increased in the reaction step S140 of carbon particles and Si.

By the method as described above, a molded body in which carbon particles are introduced into the pores, that is, a second molded body can be formed.

Step S130

Next, if necessary, the second molded body is dried.

This step S130 is performed to ensure removal of the dispersion medium contained in the second molded body.

The method of drying treatment is roughly classified into two types, that is, "heat drying method" and "vacuum freeze-drying method".

The heating and drying method is a drying method in which the second molded body is heated to volatilize and remove the dispersion medium. The heating temperature changes depending on the type of dispersion medium. When the dispersion medium is water, the heating temperature may be in the range of 100° C. to 120° C.

On the other hand, in the vacuum freeze-drying method, first, the second molded body placed in the drying chamber is cooled and frozen. As a result, the dispersion contained in the second molded body is also frozen. The cooling temperature is set to a temperature equal to or lower than the temperature at which the dispersion medium freezes. For example, when the dispersion medium contains water, the cooling temperature may be in the range of −5° C. to −50° C.

Then, the dispersion medium is sublimated and removed by vacuum-exhausting the drying chamber to dry the second molded body.

In the heating and drying method, when the vaporization of the dispersion medium in the pores gradually progresses, the remaining dispersion medium moves to the pore walls forming the pores, passes through the state of adhering to the pore walls, and is then completely vaporized. Since the carbon particles also follow such a liquid flow, the carbon particles tend to be agglomerated and segregated on the pore walls after the drying treatment.

On the other hand, in the vacuum freeze-drying method, the dispersion medium is sublimated and removed in a small movement within the pores. Therefore, in the vacuum freeze-drying method, the dispersion medium can be removed while maintaining the distribution state of the carbon particles in the pores before the drying treatment. Therefore, aggregation of carbon particles is unlikely to occur.

As described above, step S130 is a step that is performed as necessary and does not necessarily need to be actively performed. For example, the second molded body may be naturally dried.

Step S140

Next, in step S140, a SiC—Si composite component is produced from the dried second molded body.

In addition, before this step S140, a process of sintering the second molded body (hereinafter, referred to as "pre-sintering process") may be performed.

By performing the pre-sintering treatment, at least some of the SiC particles are sintered and bonded to each other in the second molded body, and the shape can be further stabilized. Further, it seems that the mechanical strength of the SiC—Si composite component finally obtained (that is, after step S140) can be further increased.

The conditions of the pre-sintering treatment, that is, the treatment temperature, the treatment time, the treatment environment and the like are not particularly limited as long as at least a part of the SiC particles is sintered and bonded.

The pre-sintering process is not always a necessary process and may be omitted.

Next, the second molded body is impregnated with metallic silicon (Si).

Further, a part of the impregnated metallic Si reacts with the carbon particles contained in the pores of the second molded body generates silicon carbide (SiC). Further, the SiC particles included in the second molded body and the SiC newly generated in this step S140 are mutually sintered to form a sintered body. Hereinafter, these processes will be collectively referred to as "reactively sintering process".

Note that, the portion that did not react with the carbon particles among the introduced metal Si remains as it is. Therefore, the SiC—Si composite component is formed after the reaction sintering process.

Here, as described above, the pores of the second molded body are impregnated with carbon particles having a relatively small average particle size. Therefore, the reaction between the carbon particles and Si, that is, the reaction for producing SiC, proceeds relatively quickly in the reaction sintering process. As a result, the sintering reaction between some SiC is also accelerated.

The method of impregnating the second molded body with metallic Si in step S140 is not particularly limited. For example, the second molded body and the metallic Si are heated and the metallic Si may be molten in a state where the second molded body and the metallic Si are in contact with each other. In this case, the pores of the second molded body are impregnated with the molten metallic Si by the capillary phenomenon. Further, when the metallic Si is molten in a state where the metallic Si is placed on the upper part of the second molded body, the effect of gravity is further utilized to impregnate the pores of the second molded body with the molten metallic Si.

When such a method is adopted, the heating temperature of the second molded body and the metallic Si (hereinafter collectively referred to as "body to be heated") may be equal to or higher than the melting point of the metallic Si. For example, the heating temperature is preferably in the range of the melting point of metallic Si to 1650° C. The melting point of metallic Si is approximately 1410° C. to 1414° C., although the melting point of metallic Si varies slightly depending on the measuring method.

When the heating temperature of the body to be heated is adjusted in the range of the melting point of metallic Si to 1650° C., the reaction sintering process can be performed simultaneously with the impregnation of the molten metallic Si into the second molded body.

In the above method, the processing environment of the body to be heated is preferably a reduced pressure environment.

The second molded body may be impregnated with metallic Si using a different method.

The amount of metallic Si introduced into the second molded body is determined based on the amount of carbon particles contained in the second molded body and the Si concentration contained in the finally obtained SiC—Si composite component.

For example, the amount of Si required for the sintering reaction of SiC, which is calculated from the amount of carbon particles contained in the second compact, is $R_1$. The amount of Si required for the sintering reaction of SiC, which is calculated from the Si concentration in the metallic state in the SiC—Si composite component is $R_2$. The amount R of metallic Si, which is introduced into the second molded body, is determined by $R=R_1+R_2$.

Through the above steps, the SiC—Si composite component can be produced.

The content of Si contained in the obtained SiC—Si composite component is in the range of 5% by mass to 40% by mass, and preferably in the range of 8% by mass to 30% by mass, based on the total weight of the SiC—Si composite component. In other words, the content of SiC contained in the SiC—Si composite component is in the range of 60% by mass to 95% by mass, and in the range of 70% by mass to 92% by mass, based on the total weight of the SiC—Si composite component. When the content of Si contained in the SiC—Si composite component is less than 5% by mass, the impregnation operation of the dispersion of the carbon particles into the first molded body is required for several times, thereby the process becomes complicated and unfavorable. When the content of Si contained in the SiC—Si composite member exceeds 40% by mass, the mechanical strength of the SiC—Si composite becomes low and unfavorable.

According to the first production method, a SiC—Si composite component having a small porosity and a high bulk density can be produced. For example, the porosity of the SiC—Si composite component is in the range of 0 vol % to 3 vol %. The bulk density of the SiC—Si composite component is in the range of 2.79 g/cm³ to 3.16 g/cm³.

Therefore, according to the first production method, a SiC—Si composite component having good mechanical strength can be obtained. The 4-point bending strength of the SiC—Si composite component may be 100 MPa or more, for example 190 MPa or more.

In the present application, the 4-point bending strength is a value measured by the method specified in JIS R1601 (test method for bending strength of fine ceramics).

Further, a SiC—Si composite component having a complex shape and/or a large-sized shape can be produced in the first production method.

Heretofore, one embodiment of the present invention has been described by referencing the first production method as an example. However, it is obvious to a person skilled in the art that the production method according to the present invention is not limited to the first production method. For example, each step included in the first production method may be modified within the scope of the present invention.

SiC—Si Composite Component According to One Embodiment of the Present Invention Hereinafter, an example of the SiC—Si composite component according to one embodiment of the present invention will be described in detail with reference to FIG. 2.

Figure 2:
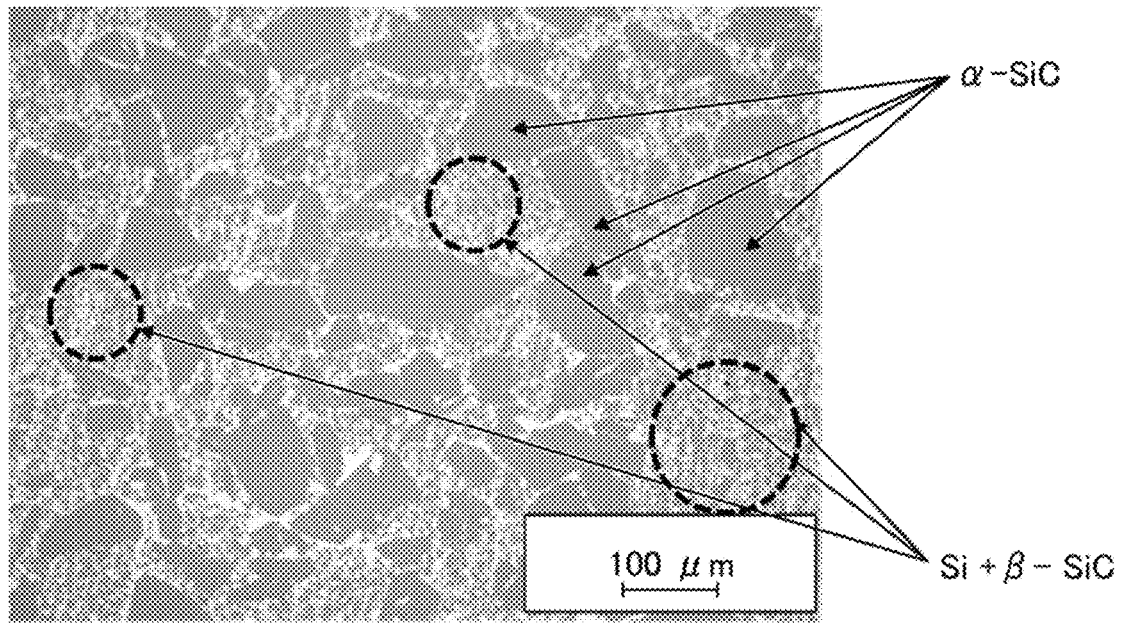
FIG. 2 is a diagram showing an example of a micrograph of a SiC—Si composite component according to an embodiment of the present invention.

FIG. 2 shows an example of a micrograph of a SiC—Si composite component (hereinafter referred to as "first composite component") according to one embodiment of the present invention.

As shown in FIG. 2, the microstructure of the first composite component has a so-called "sea-island structure" in which metallic Si as "sea portion" and α-SiC particles and β-SiC particles as "island portion" are mixed.

More specifically, in the microstructure of FIG. 2, the "sea portion" that appears white is metallic Si, and the large "island portion" that appears black is α-SiC particles. In addition, small black "island portion" dispersed in the "sea portion" of metallic Si are β-SiC particles.

It should be noted that it can be determined by Raman microspectroscopy whether each part of the microstructure is α-SiC particles, β-SiC particles or metallic Si. That is, in the case of α-SiC particles, large peaks occur at the respective positions of 766 $cm^{-1}$, 788 $cm^{-1}$ and 797 $cm^{-1}$ in the Raman spectrum. Further, in the case of β-SiC particles, a large peak appears at the position of 796 $cm^{-1}$ in the Raman spectrum. In contrast, a large peak occurs at the position of 521 $cm^{-1}$ in the case of metallic Si.

In this way, each part of the microstructure can be identified.

Hereinafter, the portion of α-SiC particles is referred to as a "first island portion", and the portion of β-SiC particle is also referred to as a "second island portion" in the microstructure of the first composite component.

The first island portion, that is, the α-SiC particles, has an average particle diameter in the range of 30 μm to 200 μm. The α-SiC particles, for example, may have an average particle size in the range of 50 μm to 180 μm.

In contrast, the second island portion, that is, β-SiC particles, has an average particle size in the range of 1 μm to 20 μm. However, when the second island portion is observed in detail in FIG. 2, the β-SiC particles are not necessarily separated from each other in the first composite component. That is, at least some of the second island portions in FIG. 2 are connected to each other.

The average particle size of α-SiC particles in the microstructure can be obtained from a micrograph. That is, 200 or more of α-SiC particles having a major axis of 30 μm or more are selected, and the average value of the major axis and the minor axis of each particle is calculated. Next, the average particle size of the α-SiC particles is obtained by averaging the obtained average values for all the selected α-SiC particles. Image analysis software WinROOF2015 is used for the measurement.

The average particle size of β-SiC particles can be similarly obtained from the micrograph. In this case, 200 or more of β-SiC particles having a major axis of 30 μm or less are selected from the micrograph. After that, the equivalent circle diameter of each particle is calculated using the image analysis software WinROOF 2015, and the average particle diameter of the β-SiC particles is obtained by averaging all the selected β-SiC particles.

In the first composite component, the total content of α-SiC particles and β-SiC particles is, for example, 60% by mass or more and 95% by mass or less. In contrast, the content of metallic Si is, for example, 5% by mass or more and 40% by mass or less in the first composite component. In this case, the first composite component can be produced easily and the component with high strength can be easily obtained.

The total content of α-SiC particles and β-SiC particles is preferably 70% by mass or more and 90% by mass or less. The content of metallic Si is preferably 10% by mass or more and 30% by mass or less.

In the first composite component, the ratio A of the volume of the α-SiC particles to the volume of the β-SiC particles, that is, A=(volume of α-SiC)/(volume of β-SiC) is 0.5 to 10.

In addition, in order to reduce ratio A to 0.5 or less, the concentration of carbon particles in the dispersion needs to be high. However, in such a case, the viscosity of the dispersion increases. As a result, the pores of the first molded body may be hardly impregnated with the carbon particles. Further, in order to increase the ratio A to 10 or more, the porosity of the first molded body is need to be small, but it is not practical because the porosity of the molded body is controlled by the bulk density of α-SiC particles.

The ratio A is preferably in the range of 0.7 to 3.

In contrast, in the first composite member, the ratio B of the volume of β-SiC particles to the volume of metallic Si, that is, B=(volume of β-SiC)/(volume of metallic Si) is 0.4 to 12. In this case, the dispersibility of the carbon particles is stabilized during the production of the first composite component. The ratio B is preferably in the range of 0.4 to 4.

It should be noted that both the ratio A and the ratio B can be obtained by performing image processing on the microstructure in the cross-section of the first composite component to obtain the area ratio. That is, because the first composite component has a relatively homogeneous structure in the three-dimensional direction, the volume ratio can be directly calculated from the obtained area ratio.

In the present application, the above area ratios were measured in the cross-sections of five different microstructures, and the ratio A and the ratio B were calculated from the five averages obtained from the measurements.

Image analysis software WinROOF2015 was used for the image processing.

Specifically, this software was used to perform monochrome processing of the microstructure photograph image and then perform automatic binarization processing to calculate the SiC area and the Si area.

In addition, particles having a particle size of 30 μm or more were selected from the structure photograph image, the calculated area was taken as the α-SiC area, and the value obtained by subtracting the α-SiC area from the above-mentioned SiC area was taken as the β-SiC area. Using these areas, the ratio A and the ratio B were calculated.

Further, when the microstructure of the cross-section of the first composite component is photographed at a magnification of 20 times, the P value obtained by the following procedure is preferably 3 or more.

<How to Obtain P Value>

Figure 3:
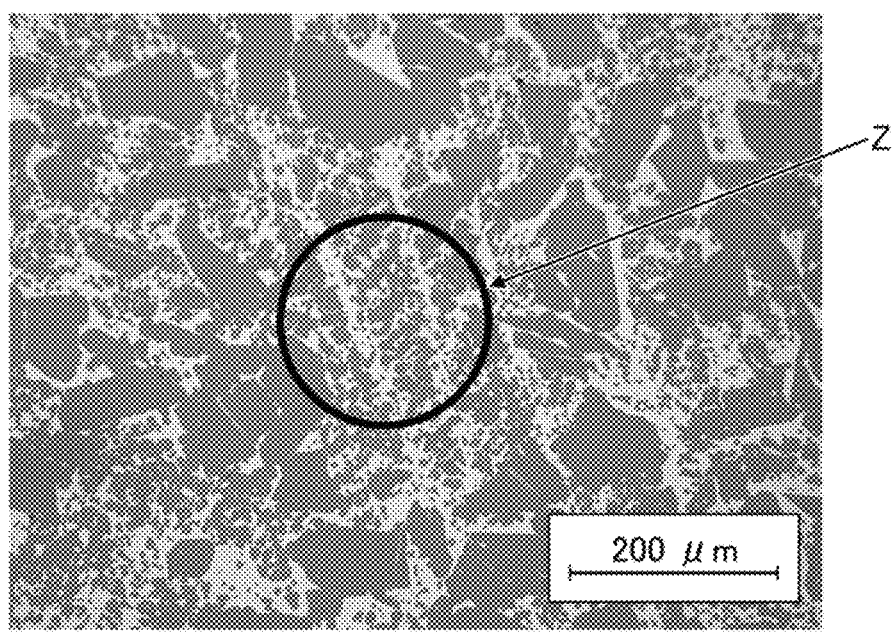
FIG. 3 is a diagram showing an example of a circle having a diameter of 200 μm drawn on the microstructure of the SiC—Si composite component according to the embodiment of the present invention.
Figure 4:
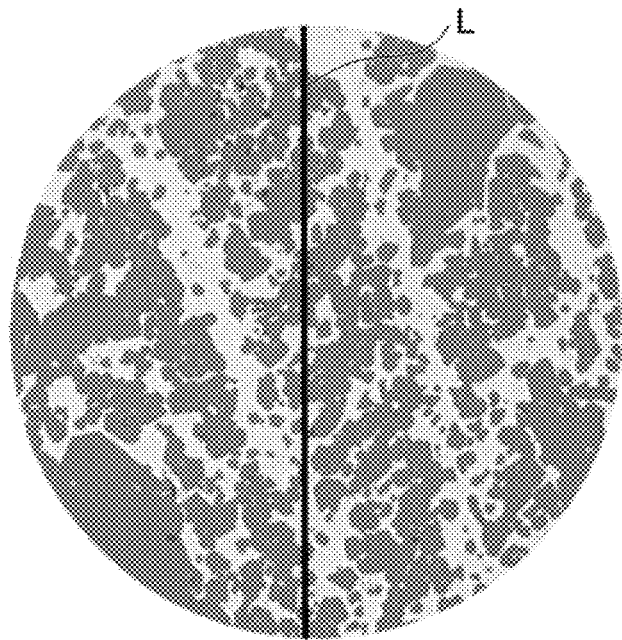
FIG. 4 is a diagram showing an example of a first straight line having a length of 200 μm drawn in the circle shown in FIG. 3.

P value is obtained by the following:
- (i) In the second island portion of the microstructure, a circle Z is drawn having a diameter of 200 μm with the center X of any β-SiC particle in a region formed by connecting a plurality of β-SiC particles to each other. For example, FIG. 3 shows an example of a circle Z drawn on the microstructure by such operation.
- (ii) Next, a first straight line having a length of 200 μm and passing through the center X is drawn in the circle Z. For example, FIG. 4 shows an example of the first straight line L drawn in the circle Z by such operation.
- (iii) In the circle Z, a second straight line having a length of 200 μm and having a rotation angle of 1° with respect to the first straight line L with the center X as the central axis is drawn.
- (iv) The same operation as (iii) is repeated until the rotation angle is 180°, and a total of 180 straight lines are drawn in the circle Z.
- (V) In each straight line, length of the line segment of one or a plurality of lines which across "the sea portion" of the metal Si is measured. An average value $S_{ave}$ of the length of segments in each straight line is calculated. As a result, the average value $S_{ave}$ corresponding to each of the 180 straight lines is obtained.

(Vi) The ratio P is calculated by selecting a straight line in which the average value $S_{ave}$ becomes maximum from the 180 straight lines and set as maximum $S_{max}$, selecting a straight line in which the average value $S_{ave}$ becomes minimum from the 180 straight lines and set as minimum $S_{min}$, and calculating the ratio P by the following formula:

$$P = S_{max}/S_{min}. \tag{1}$$

The operation (v) can be statistically performed by using image analysis software (for example, WinROOF2015).

The P value obtained in this way can be an index showing the degree of connection between the second island portions in the first composite component. That is, the higher the P value, the longer the second island portions are connected in a row.

Further, when the P value is 3 or more, many β-SiC particles are connected to each other in the second island portion, and thus such a first composite component tends to have high strength. For example, the first composite component has a strength of 190 MPa or more as determined by a 4-point bending test (JIS R1601 (test method of bending strength for fine ceramics at room temperature)).

Furthermore, the first composite component may have a thermal conductivity of 200 W/m·K or more. The thermal conductivity is, for example, 220 W/m·K or more. In the first composite component, when many β-SiC particles are interconnected in the second island portion, high thermal conductivity is obtained.

The first composite component having the above-described microstructure can be obtained, for example, when the drying step (step S130) is carried out by the freeze-drying method in the above-mentioned first production method.

As described above, when the molded body containing the carbon particles in the pores is dried by the freeze-drying method, the aggregation of the carbon particles in the pores is significantly suppressed. Therefore, in the subsequent reaction sintering process, the carbon particles having a relatively small average particle diameter are reacted and sintered with the metallic Si, and fine β-SiC particles can be generated.

EXAMPLES

Examples will be described below. In the following description, Examples 1 to 3 and 6 are Examples, and Examples 4 to 5 are Comparative Examples.

Example 1

The SiC—Si composite component was produced according to the above-described first production method as follows.

First, the first molded body was prepared by the 3D printing method.

As the 3D printing method, the "binder jet molding method" was adopted, and the binder was injected from the inkjet nozzle toward the powder layer. A phenol resin was used as the binder.

The powder layer was a mixture of SiC particles and a curing agent. The content of the curing agent was about 0.1% by mass. As the SiC particles, α-SiC powder (manufactured by Shinano Electric Refining Co., Ltd.) having an average particle diameter of 80 μm was used. The thickness of each powder layer was about 200 μm, and the binder injection was repeated each time each powder layer was laminated.

Accordingly, a first molded body having a length of 40 mm, a width of 20 mm, and a height of 10 mm in a shape of rectangular parallelepiped was prepared.

The bulk density of the first molded body was 1.14 g/cm³. The porosity of the first molded body was 64.6%. The average pore diameter $M_1$ of the pores of the first molded body was 46.9 μm.

Next, a second molded body was formed from the first molded body.

First, the first molded body was immersed in the dispersion containing carbon particles.

The concentration of carbon particles in the dispersion was 40% by mass, and the carbon particles were nanoparticles. The average particle diameter $M_2$ of the secondary particles of the carbon particles was about 120 nm. Therefore, $M_2/M_1$ was about 0.00256. The dispersion medium was water.

The first molded body was immersed in the dispersion under a reduced pressure environment. As a result, the pores of the first molded body were impregnated with the carbon particles, and the second molded body was formed.

Then, the second molded body was dried. A vacuum freeze-drying method was used for drying. Specifically, the second molded body was allowed to pass through the range of 0° C. to −10° C. in less than 20 minutes so that the water content of the second molded body was sublimated by freezing the second molded body followed by vacuum-exhausting the second molded body.

The bulk density of the second molded body was 1.37 g/cm³ and the porosity was 53.2%.

Moreover, when the concentration of the carbon particles contained in the second molded body was measured using a thermal analysis method, the content of the carbon particles with respect to SiC in the molded body was 20% by mass.

Next, the second molded body was impregnated with metallic Si.

For the impregnation treatment with metallic Si, the body to be heated constituted by placing metallic Si on the second molded body was placed in the reaction furnace. The amount of metallic Si was 12.7 g.

Next, the body to be heated was heated to 1550° C. in a state where the inside of the reaction furnace was in a reduced pressure environment.

By this treatment, the metallic Si was molten, and the second molded body was impregnated with the molten material. At the same time, the reactive sintering process proceeded. That is, SiC was formed by the reaction between the carbon in the pores and the impregnated Si, and a sintering reaction was occurred between the SiC contained in the second molded body which also containing these newly generated SiC.

As a result, a sintered body (SiC—Si composite component) was formed.

The sintered body (hereinafter, referred to as "sintered body according to Example 1") was maintained as a rectangular parallelepiped having a length of 40 mm, a width of 20 mm, and a height of 10 mm.

Example 2

A sintered body (hereinafter referred to as "sintered body according to Example 2") was produced by the same method as in Example 1.

However, in this Example 2, the concentration of carbon particles in the dispersion was 50% by mass. The average particle size $M_2$ of the secondary particles of the carbon particles was about 130 nm. Other conditions were the same as in the case of Example 1.

Example 3

A sintered body (hereinafter referred to as "sintered body according to Example 3") was produced by the same method as in Example 1.

However, in this example 3, the average particle diameter of the SiC particles was 150 μm. Other conditions were the same as in the case of Example 1.

Example 4

A sintered body (hereinafter referred to as "sintered body according to Example 4") was produced by the same method as in Example 1.

However, in this Example 4, the step of immersing the first molded body in the dispersion containing carbon particles was not performed. That is, the steps after the impregnation of the metallic Si using the first molded body were performed. Further, the first molded body was naturally dried before being subjected to the impregnation treatment with metallic Si.

Example 5

A sintered body (hereinafter referred to as "sintered body according to Example 5") was produced by the same method as in Example 1.

However, in Example 5, the average particle size of the SiC particles was set to 1 μm. Other conditions were the same as in the case of Example 1.

Table 1 below collectively shows the conditions used for producing the sintered bodies according to the respective examples.

Evaluation

The following evaluations were performed using the sintered bodies according to the above-mentioned Examples 1 to 5.

Physical Property Value

The physical properties of each sintered body were measured. Specifically, the amount of unreacted metallic Si contained in each sintered body, the bulk density, and the porosity were measured.

The measurement results are shown in Table 2 below.

TABLE 2

| Examples | Amount of metallic Si (% by mass) | Bulk density (g/cm³) | Porosity (%) |
| --- | --- | --- | --- |
| 1 | 33.4 | 2.86 | 0.2 |
| 2 | 29.1 | 2.92 | 0.8 |
| 3 | 33.8 | 2.85 | 0.4 |
| 4 | 56.9 | 2.65 | 0.1 |
| 5 | 55.3 | — | — |

As a result of the measurement, the sintered body according to Example 4 had a bulk density of 2.65 g/cm³, which was not so high.

On the other hand, the sintered bodies according to Examples 1 to 3 all have a bulk density of 2.85 g/cm³ or more, and have a high bulk density. In addition, the porosity was less than 3 vol %.

In addition, the sintered body according to Example 5 had poor uniformity. Therefore, various evaluations were not performed.

Strength

The strengths of the sintered bodies according to Examples 1 to 3 were evaluated by a 4-point bending test.

TABLE 1

| Examples | Average particle size of α-SiC (μm) | Bulk density of first molded body (g/cm³) | Porosity of first molded body (%) | Average pore size $M_1$ of first molded body (μm) | C partcle concentration in dispersion (% by mass) | Average partcle diamter $M_2$ of C particles (agglomerated particles) in dispersion (nm) | $M_2/M_1$ | Bulk density of second molded body (g/cm³) | Porosity of second molded body (%) | Content of C particles based on SiC in second molded body (% by mass) | Drying method of second molded body |
| --- | --- | --- | --- | --- | --- | --- | --- | --- | --- | --- | --- |
| 1 | 80 | 1.14 | 64.6 | 46.9 | 40 | 120 | 0.00256 | 1.37 | 53.2 | 20 | vacuum freeze drying |
| 2 | 80 | 1.14 | 64.6 | 46.9 | 50 | 120 | 0.00256 | 1.41 | 50.9 | 24 | vacuum freeze drying |
| 3 | 150 | 1.18 | 63.4 | 75.1 | 40 | 120 | 0.0016 | 1.39 | 52.7 | 18 | vacuum freeze drying |
| 4 | 80 | 1.14 | 64.6 | 46.9 | — | — | — | — | — | — | Natural drying |
| 5 | 1 | 1.06 | 66.5 | 0.6 | 40 | 120 | 0.2 | 1.11 | 64.8 | 3 | vacuum freeze drying |

The 4-point bending test was performed by cutting out a sample from each sintered body. The size of the sample was 36 mm in length×4 mm in width×3 mm in thickness. The 4-point bending test was carried out in accordance with JIS R1601 (test method of bending strength for fine ceramics at room temperature).

The measurement results are shown in Table 3 below.

TABLE 3

| Examples | Bending strength (MPa) |
|---|---|
| 1 | 206 |
| 2 | 259 |
| 3 | 192 |
| 4 | 48 |
| 5 | — |

As a result of the measurement, the 4-point bending strength of each of the sintered bodies was 192 MPa or more, and each sintered body had good strength.

As described above, the SiC—Si composite produced by using the method according to the embodiment of the present invention had high density and had favorable mechanical strength.

Example 6

A sintered body (hereinafter referred to as "sintered body according to Example 6") was produced by the same method as in Example 2.

However, in Example 6, the heating temperature of the body to be heated in the reactive sintering process was 1450° C. That is, the body to be heated, which was reconfigured by placing metallic Si on the second molded body, was heated to 1450° C. in the reaction furnace. Other conditions were the same as in the case of Example 2.

Evaluation

The following evaluation was performed using the sintered body according to Example 6.

Organizational Evaluation

The structure was observed on the cross-section obtained by cutting the sintered body according to Example 6.

FIG. 2 described above shows a micrograph of the structure of the cross-section.

From FIG. 2, the structure of the sintered body according to Example 6 has a sea-island structure.

Raman microspectroscopic measurement was performed on the obtained cross-sectional structure. As a result, α-SiC, β-SiC, and metallic Si were contained in the sintered body according to Example 6.

Figure 5:
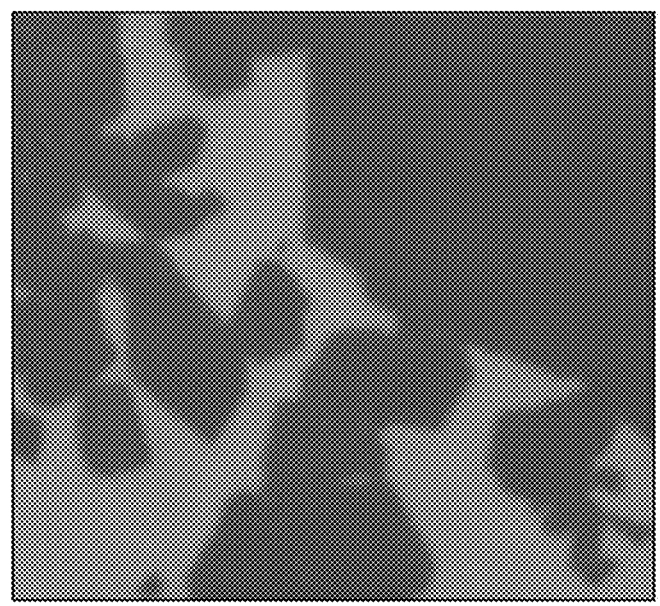
FIG. 5 is a diagram showing an example of an optical microscope photograph of a cross-section of a SiC—Si composite component according to an embodiment of the present invention.
Figure 6:
FIG. 6 is a diagram showing an example of a Si mapping pattern in the cross-section shown in FIG. 5.
Figure 7:
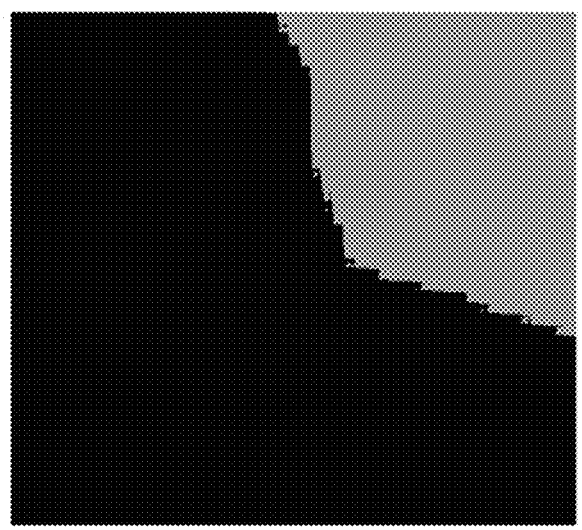
FIG. 7 is a diagram showing an example of an α-SiC mapping pattern in the cross-section shown in FIG. 5.
Figure 8:
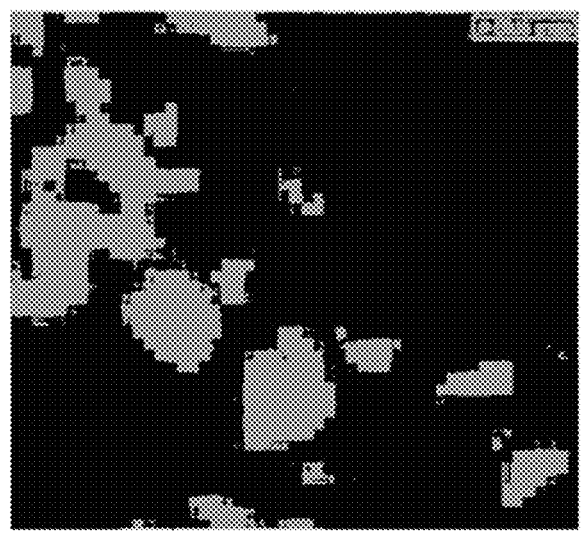
FIG. 8 is a diagram showing an example of a β-SiC mapping pattern in the cross-section shown in FIG. 5.

FIGS. 5 to 8 show mapping diagrams obtained by Raman microspectroscopic measurement. Note that FIG. 5 is an optical micrograph of the evaluation target area. FIG. 6 is a mapping pattern of Si, FIG. 7 is a mapping pattern of α-SiC, and FIG. 8 is a mapping pattern of β-SiC.

From comparison between FIGS. 5 to 8 and FIG. 2, the large first island portion is α-Si particles in the sea-island structure. Further, the small second island portion dispersed in the sea portion of metallic Si is formed from β-Si particles.

As a result of the measurement, the average particle size of the α-Si particles was 56 μm, and the average particle size of the β-Si particles was 7 μm.

Next, the P value was calculated by the above operation in the sintered body according to Example 6. Win-ROOF2015 was used as software.

FIG. 3 and FIG. 4 described above respectively show the circle Z and the first straight line L obtained in the course of the operation of calculating the P value.

Figure 9:
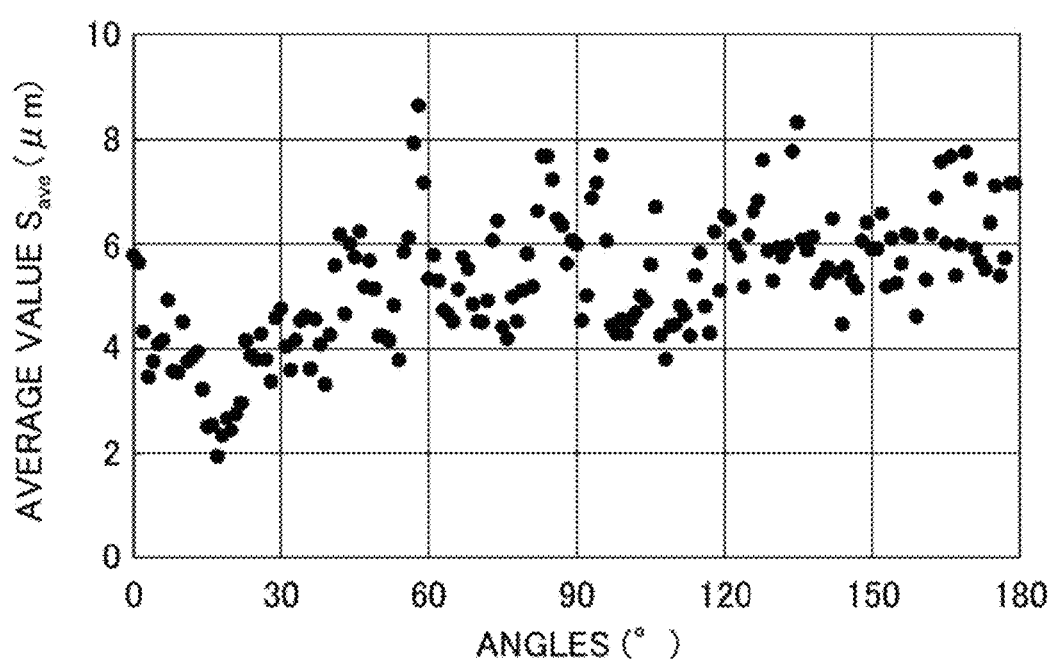
FIG. 9 is a graph showing a plot of an average value $S_{ave}$ of line segments that across the Si portion, measured on each of 180 straight lines drawn in the circle shown in FIG. 4.

FIG. 9 shows a plot of the average value $S_{ave}$ measured on each of the 180 straight lines drawn in the circle Z. As described above, the average value $S_{ave}$ is the average value obtained by averaging the respective lengths of the line segments when the target straight line across the portion of metallic Si.

In FIG. 9, the horizontal axis indicates the rotation angle of each straight line with respect to the first straight line. Therefore, the range of the horizontal axis is 0° (first straight line L) to 179°. The vertical axis represents the average value $S_{ave}$.

From FIG. 9, the maximum $S_{max}$ was 8.7 μm and the minimum $S_{min}$ was 1.9 μm in this operation. Therefore, the P value obtained from the following formula (1) was 4.6.

$$P = S_{max}/S_{min} \qquad (1)$$

Next, the above-mentioned ratio A (=volume of α-SiC/volume of β-SiC) and ratio B (volume of β-SiC/volume of metallic Si) were calculated by the image processing from the cross-section of the obtained microstructure.

In Table 4 below, the measurement results of the area ratios obtained from the five cross-sectional structures are shown.

TABLE 4

|  | No. 1 | No. 2 | No. 3 | No. 4 | No. 5 | Average value |
|---|---|---|---|---|---|---|
| Si area ratio | 0.25 | 0.25 | 0.25 | 0.24 | 0.26 | — |
| α-SiC area ratio | 0.37 | 0.38 | 0.37 | 0.33 | 0.31 | — |
| β-SiC area ratio | 0.38 | 0.37 | 0.38 | 0.43 | 0.43 | — |
| (α-SiC area ratio)/(β-SiC area ratio) | 0.96 | 1.01 | 1.00 | 0.77 | 0.72 | 0.88 |
| (β-SiC area ratio)/(Si area ratio) | 1.53 | 1.49 | 1.50 | 1.79 | 1.65 | 1.60 |

From the five measurement results, the average value of (area ratio of α-SiC)/(area ratio of β-SiC), that is, the ratio A was 0.88. Further, the average value of (β-SiC area ratio)/(Si area ratio), that is, the ratio B was 1.60.

In the sintered body of Example 6, the total content of α-SiC particles and β-SiC particles was 82% by mass.

Strength

The strength of the sintered body according to Example 6 was evaluated by a 4-point bending test. As a result, the strength was 280 MPa.

Thermal Conductivity

The thermal conductivity of the sintered body according to Example 6 was evaluated by the xenon flash method. As a result, the thermal conductivity at 25° C. was 226 W/m·K.

The invention claimed is:

1. A method of producing a SiC—Si composite component comprising:
   forming a first molded body containing SiC particles by powder additive manufacturing, the first molded body being a porous body;
   introducing carbon particles into pores in the first molded body to form a second molded body;
   drying the second molded body by vacuum freeze drying; and
   impregnating the second molded body with a metal Si and reactively sintering the second molded body to form the SiC—Si composite component.

2. The method according to claim 1, wherein in the vacuum freeze drying, a cooling temperature is in a range of −5° C. to −50° C.

3. The method according to claim 1, wherein the vacuum freeze drying includes freezing the second molded body such that a temperature variation of the second molded body is 0° C. to −10° C. in less than 20 minutes.

4. The method according to claim 1, wherein the introducing the carbon particles includes bringing the first molded body into contact with a dispersion including the carbon particles to form the second molded body in which the carbon particles are introduced into the pores of the first molded body, and
   wherein in the vacuum freeze drying, a temperature at which the second molded body is cooled is set to be less than or equal to a temperature at which a dispersion medium of the dispersion freezes.

5. The method according to claim 1, wherein the carbon particles satisfies the relation $M_2 \leq M_1/10$, and wherein $M_1$ is a first average pore diameter of the first molded body, and $M_2$ is a secondary particle diameter of the carbon particles in the dispersion.

6. The method according to claim 1, wherein in the forming of the SiC—Si composite component, the SiC—Si composite component includes Si in a range of 5% by mass to 40% by mass.

7. The method according to claim 5, wherein the first average pore diameter is in a range of 20 μm to 100 μm, and
   wherein the secondary particle diameter of the carbon particles in the dispersion is in a range of 100 nm to 200 nm.

8. The method according to claim 1, wherein the SiC particles have an average particle size in a range of 30 μm to 200 μm.

9. The method according to claim 4, wherein a content of the carbon particles in the dispersion is in a range of 20% by mass to 60% by mass.

10. The method according to claim 1, wherein the powder additive manufacturing includes laser additive manufacturing or binder jetting.

11. The method according to claim 1, further comprising:
    impregnating the metal Si in the presence of the second molded body at a temperature that is greater than or equal to a melting point of the metal Si.

12. The method according to claim 1, wherein in the forming of the SiC—Si composite component, a bulk density of the SiC—Si composite component is 2.79 g/cm³ or more.

13. The method according to claim 1, wherein in the forming of the SiC—Si composite component, the SiC—Si composite component has a thermal conductivity of 200 W/m·K or more.

* * * * *